United States Patent
Walker

(10) Patent No.: US 6,708,939 B2
(45) Date of Patent: Mar. 23, 2004

(54) RETAIL STORE INFORMATION DISPLAY DEVICE

(76) Inventor: Don Walker, 9 Artesian Ave., Holland Landing, Ontario (CA), L9N 1J3

( * ) Notice: Subject to any disclaimer, the term of this patent is extended or adjusted under 35 U.S.C. 154(b) by 0 days.

(21) Appl. No.: 10/071,250

(22) Filed: Feb. 11, 2002

(65) Prior Publication Data

US 2002/0195531 A1 Dec. 26, 2002

Related U.S. Application Data

(63) Continuation-in-part of application No. 09/629,894, filed on Jul. 31, 2000, now abandoned, which is a continuation-in-part of application No. 09/311,265, filed on May 14, 1999, now abandoned.

(51) Int. Cl.$^7$ ................................................ A47H 1/10
(52) U.S. Cl. .......................................... 248/323; 40/617
(58) Field of Search ................................. 248/323, 322, 248/320, 343, 344; 40/617, 415, 445, 601, 491, 492

(56) References Cited

U.S. PATENT DOCUMENTS

| 3,431,585 A | 3/1969 | Foltz |
| 3,944,180 A | 3/1976 | Rogers |
| 5,090,654 A | 2/1992 | Ridings |
| 5,381,991 A | 1/1995 | Stocker |
| 5,402,979 A | 4/1995 | Bellamy |
| 5,409,191 A | * 4/1995 | Wenmaekers ............... 248/317 |
| 5,653,412 A | 8/1997 | Martorano |

FOREIGN PATENT DOCUMENTS

GB  2233808 A  * 1/1991

\* cited by examiner

Primary Examiner—Ramon O. Ramirez

(57) ABSTRACT

The present invention provides a retail store information display device for suspension from a ceiling over merchandise displays or aisles. The retail store information display system comprises one or more panels containing information, an elongated horizontal track, a plurality of carrier means slidably supported by said track, and connecting means for suspending the track from a ceiling a sufficient height above any merchandise displays or aisles. The panels can be positioned with respect to the merchandise displays or aisles by sliding them along the horizontal track. The retail store information display device assists retailers in hanging panels, such as signs and banners, quickly and uniformly throughout a store.

13 Claims, 3 Drawing Sheets

RETAIL STORE INFORMATION DISPLAY DEVICE

CROSS REFERENCE TO RELATED APPLICATION

This application is a continuation-in-part of application Ser. No. 09/629,894 filed Jul. 31, 2000 which was a continuation-in-part of application Ser. No. 09/311,265 filed May 14, 1999, both applications now abandoned.

BACKGROUND OF THE INVENTION

1. Field of the Invention

This invention relates to a retail store information display device for suspension from a ceiling over merchandise displays or aisles. In particular the present invention provides a means to assist retailers in hanging panels containing information, such as signs and banners, quickly and uniformly throughout the store.

2. Description of the Prior Art

Information panels, such as signs and banners, are typically hung from the ceilings of retail stores by a series of hooks, wire or chains. For example U.S. Pat. No. 5,480,116 describes a sign holder assembly utilizing a plastic clip that snaps over a ceiling grid to hang a sign. While slight movement of the clip on the grid is possible, generally the system requires a person utilizing a step ladder to install the sign on one clip and then the ladder is moved and the sign installed on a second clip. Hanging signs over merchandise displays at the end of aisles requires considerable time and effort.

U.S. Pat. No. 4,880,195 discloses a system for supporting a banner mounted on a pole. U.S. Pat. Nos. 4,223,488; 4,118,000; 4,667,913; 3,618,176 and 4,315,611 all describe devices for suspending articles from ceilings.

All of the prior art systems are fixed systems. If the sign or banner is replaced by a sign or banner of a different size, the hanging system needs to be repositioned. In addition the sign or banner needs to be hung one end at a time requiring movement of ladders or scaffolding and a significant labour time. When no sign is present the hangers need to be removed or they are unsightly.

SUMMARY OF THE INVENTION

It is an object of the invention to provide a retail store information display device to assist retailers in hanging panels containing information, such as signs and banners, quickly and uniformly throughout the store.

It is a further object of the invention to provide a system that will remain in the ceiling after installation with no further maintenance required.

Thus in accordance with the present invention there is provided a retail store information display device for suspension from a ceiling over merchandise displays or aisles. The information display device according to the present invention consists of a panel section containing information, said panel section having a top edge and first and second ends; an elongated horizontal track having first and second ends; a plurality of carrier means are supported by the track and can slide along the track; and connecting means for suspending the track from a ceiling, a sufficient height above any merchandise displays or aisles. The top edge of the panel is adapted for attachment to the plurality of carrier means from one end of the track by connecting a first end of the top edge of the panel to a first group of one or more of the carrier means. The first group of carrier means and the attached panel are slid along the track. Once the panel has been moved along the track, a second end of the top edge of the panel can be connected to a second group of one or more of said carrier means. The second group of carrier means slide along the track to position the panel with respect to the merchandise displays or aisles. In order to mount the banner hanging system to a suspended ceiling the connecting means is fastened to a T-bar of a suspended ceiling by a T-bar ceiling track clip.

In another embodiment of the present invention the connecting means for suspending the track from the ceiling is adapted to permit the track to be raised and lowered from the ceiling to further facilitate hanging the panel.

In a further embodiment the present invention there is provided a method of hanging from a ceiling one or more signs or banners having a top edge, over merchandise displays or aisles said method comprising (a) suspending a sign and banner hanging system according to the present invention from a ceiling, (b) connecting a first part of the top edge of a sign or banner to a first carrier means, (c) sliding the first carrier means along said track, (d) attaching a second part of the top edge of said sign or banner to a second carrier means, (e) sliding the second carrier means along said track, (f) repeating steps (d) and (e) until the sign or banner is fully suspended then (g) sliding the sign or banner into place over the merchandise display or aisle.

Further features of the invention will be described or will become apparent in the course of the following detailed description.

BRIEF DESCRIPTION OF THE DRAWINGS

In order that the invention may be more clearly understood, the preferred embodiment thereof will now be described in detail by way of example, with reference to the accompanying drawings, in which.

DETAILED DESCRIPTION OF THE PREFERRED EMBODIMENT

Figure 1:
FIG. 1 is a photograph of the retail store information display device according to the present invention.

Referring to FIGS. 1 to 4, a retail store information display device according to the present invention is generally indicated at 1. The retail store information display device was developed to assist retailers in hanging information panels, such as signs and banners, quickly and uniformly throughout the store. This unique system is self-contained, eliminating the need for the use of barnacle clips and hooks to hang banners. Once the system is installed, it will remain in the ceiling with no further maintenance required. The system is composed of an elongated horizontal track 3 and carrier means 6 for retaining at least one panel, such as a sign or banner. The track 3 is adapted to slidably retain the carrier means 6. Connector means 4 are provided for suspending the track 3 from a ceiling. The connector means 4 for suspending the track 3 from a ceiling preferably comprises two or more vertical rods 5 having first 7 and second 8 ends. The first end 7 of said rods 5 is fastened to the track 3 and the second end 8 of said rods 5 is fastened to the ceiling. In order to mount the banner hanging system to a suspended ceiling the second end 8 of the rods 5 is fastened to the t-bar of a suspended ceiling by a t-bar ceiling track clip 9. The first or second end 7,8 of rod 5 can preferably be further adapted to include means to permit the track 3 to be raised or lowered to further facilitate hanging the sign or banner.

Figure 2:
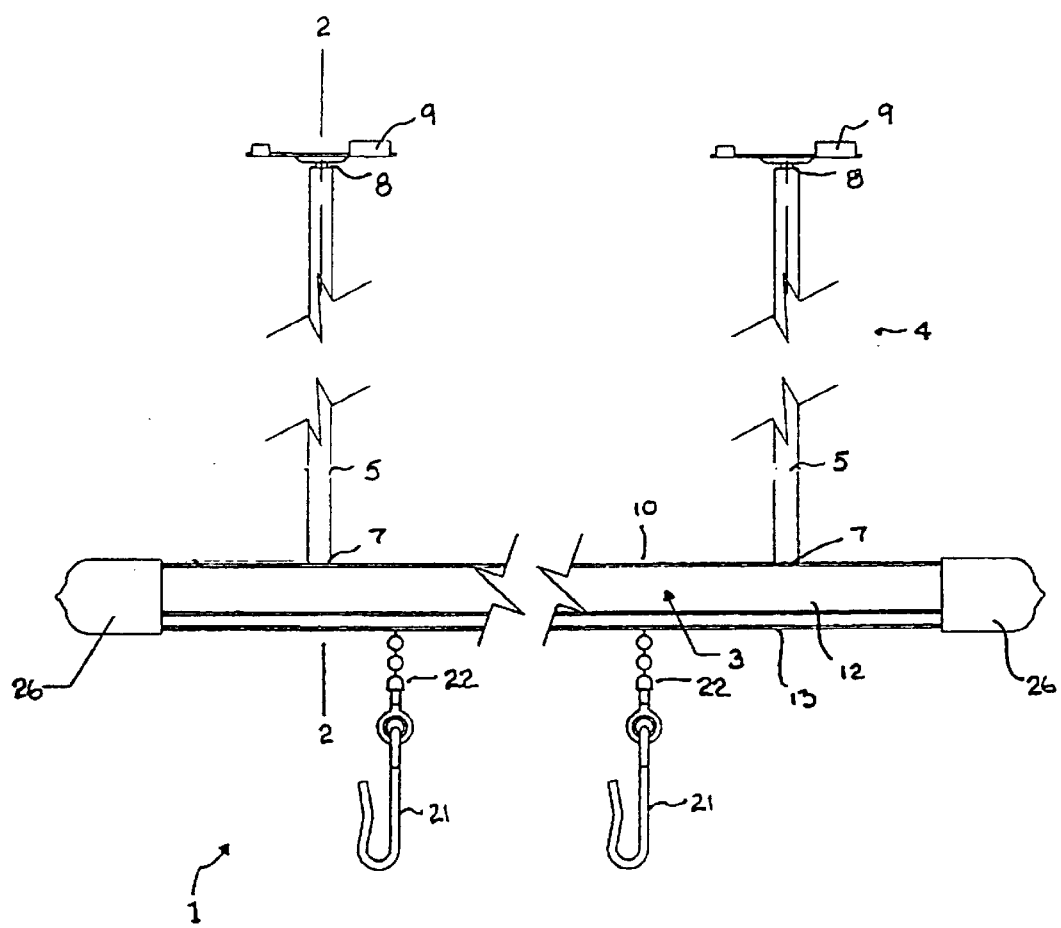
FIG. 2 is a side plan view, broken for length and height, of one embodiment of a retail store information display device of the present invention.
Figure 3:
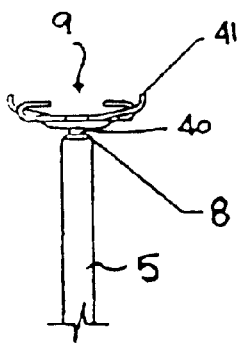
FIG. 3 is a partial cross-section through line 2—2 in FIG. 2, broken for height, of the retail store information display device shown in FIG. 2.
Figure 3:
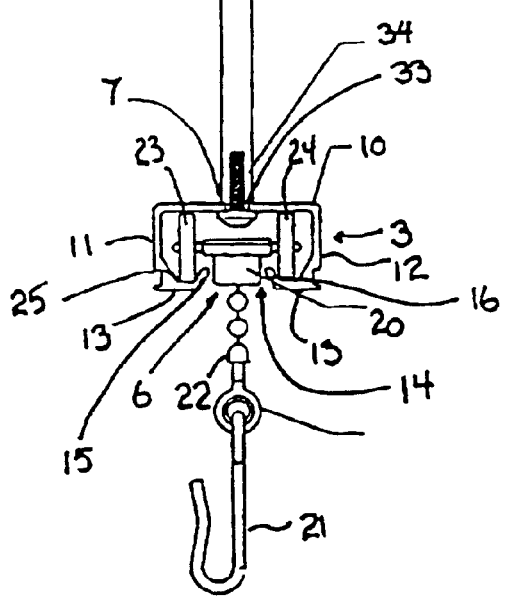
Figure 4:
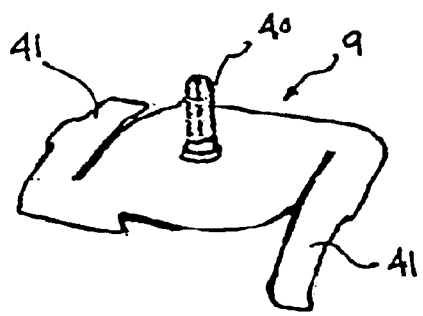
FIG. 4 is a perspective view of a T-bar track clip used with the system of FIGS. 2 and 3.

The horizontal track 3, as illustrated in the Figures, preferably, consists of a ten-foot section of extruded aluminum track. Longer lengths of track can be utilized without departing from the scope of the present invention. Track 3, as shown in FIGS. 2 and 3, has a generally rectangular box-like cross-section although other shapes are possible. Track 3 has an upper wall 10 and generally parallel depending side walls 11 and 12. Track 3 is adapted to provide a mounting means for carrier 6 to slide along track 3. In the preferred embodiment the bottom wall 13 of track 3 is provided with a centrally deposed longitudinal channel 14. The bottom wall 13 at the sides 15 and 16 of channel 14 are bent upward to create the support means for carrier 6.

Carrier 6 is adapted to retain the panel and slide along track 3. In the preferred embodiment shown in FIG. 3, carrier 6 has a generally T-shaped body portion 20. A hook 21 connected to a chain 22 or other flexible fastening means depends from body portion 20. A pair of wheels 23, 24 are rotatably mounted to the carrier 6. The wheels 23, 24 are spaced so that when inserted into track 3, the wheels 23, 24 can roll along the inside surface 25 of bottom wall 13 of track 3. Each ten-foot section of track 3 receives a number of carriers 6 with hooks which are to be left on the track once installed. The preferred embodiment has seven carriers 6 with hooks per ten-foot section of track 3. Plastic end caps 26 are placed over the ends of track 3 to retain the carriers 6 on the track. The aluminum hook 21 has to be bent out in order to accept the sign or banner.

Connector means 4 are provided to suspend the track 3 from the ceiling of the store. The connector means 4 generally consists of a series of vertical rods 5 connected at the bottom end 7 to track 3 and at their top end 8 to the ceiling. In the preferred embodiment the tracks 3 are pre-drilled with a hole 33, located 38" from each end for rod location. The length of rods 5 that is appropriate will depend on the ceiling of the store so that the banners will hang above store shelves but remain highly visible generally at about 7' 6". Standard rod lengths of 12", 24" and 36" accommodate most standard ceiling heights. Two rods 5 are generally required for each ten-foot length of track 3. The rods 5 should be perpendicular to the ceiling and track and are preferably 44" apart. In the preferred embodiment rods 5 are drilled and tapped at each end for connection to track 3 by screws 34 or other fastener and the ceiling.

To secure the rods 5 to a drywall or plaster ceiling careful measurements is required to align the rods 5 perpendicular to the track because this installation is permanent. Once the final location of track 3 is established the location of rods 5 can be determined by placing the track 3 directly to the ceiling and marking the pre-drilled hole locations into the ceiling. Any suitable fastener is acceptable. In the preferred embodiment a #2 Phillips screwdriver is placed into the recess of an E-Z Anchor and centered into the hole position. The screw driver is press into the ceiling while turning the anchor clockwise until it is set flush with the ceiling. A hanger bolt with machine end (small threads) is screwed directly into the rod ensuring that it is tightly secured. The rod and the larger threaded woodscrew end are screwed directly into the E-Z Anchor recess and tightened completely ensuring that the rod touches the E-Z Anchor.

To install the system to a suspended ceiling system a t-bar clip 9 is utilized as shown in the drawings. The T-bar clip 9 has a depending threaded stud 40 and spring clip flanges 41 to permit connection to the main T bar of the ceiling system. Suitable T-bar track clips can be obtained from most ceiling system manufacturers. Once the t-bar track clip is secured on the t-bar, it may be moved along the track for minor position adjustments. The static load limit of the clip is about 25 pounds. Avoid hanging things other than the signs or banners on the hanging system that may exceed the static load limit of the clips.

When installing the system, it is important that all parts are properly secured, as intended, and pose no hazard to store customers. In locating the system of the present invention, the following can be considered:

a. Locate panel units by column bays.

b. Concentrate the units in main traffic aisles to ensure a dominant presence for an event.

c. It is not necessary to do all aisles.

The system of the present invention can be simply installed using the following installation sequence:

a. Locate and install T-bar clips directly to the T-bar ceiling.

b. Screw in rods into ceiling clips.

c. Secure track to rods with screws. Align track and rod over pre-drill hole in track. Secure track to rod (with supplied bolts) from underneath with appropriate screw d. Adjust rods and clips so that rods are perpendicular to ceiling and track.

e. Load the carriers with hooks on each track unit at one end of the track. Ensure that each carrier runs smoothly on the track.

f. When all carriers are on the track, install the plastic end caps, as shown. Ensure that the cap is snug and completely on the track.

g. Slightly bend the aluminum hook on the carrier so that it will hook on the banner easily.

h. Hang one end of the panel from the first hook and slide it over to do the next hook and repeat until the panel is fully connected.

i. Then just slide the panel along the track until it is in place.

j. When the panels are in place, simply adjust the space between panels by sliding the carriers along the track until there is even space between panels.

When the promotion is complete, remove the panels only. The tracks are permanent and should remain up, even if not in use. The track when not in use has a very small profile and is almost undetectable to the customers' eyes. The use of the present invention requires the use of only one ladder at one spot to hang the sign and slide it into position even over hard to reach areas, thereby providing labour savings.

Special considerations are given when suspending the tracking from 10 foot ceilings: Clip the t-bar clip 9 onto the ceiling t-bar 44" apart. Adjust the distances so the threaded stud 40 on the t-bar clips 9 aligns with pre-drilled holes 33 in the track. Load carriers 6 with hooks 21 and place end caps 26 at each end of the track 3. Secure the track 3 to the t-bar by screwing caps with 3/16" nut driver onto threaded studs of t-bar clips. Remove end caps 26 and load one carrier 6 at each end of the track 3. With this method the threaded stud 40 of the t-bar clip 9 may protrude too far, inhibiting the carriers. By placing five carriers 6 between the protruding studs, and one on each side between the stud 40 and the ends of the track, the panels can be hung without difficulty. Alternatively the track can be secured directly to the ceiling t-bar with an appropriate drywall screw.

Having illustrated and described a preferred embodiment of the invention and certain possible modifications thereto, it should be apparent to those of ordinary skill in the art that the invention permits of further modification in arrangement and detail. All such modifications are covered by the scope of the invention.

The embodiment of the invention in which an exclusive property or privilege is claimed are defined as follows:

1. A retail store information display device for suspension from a ceiling over merchandise displays or aisles, said information display device consisting of one or more panel sections containing information, said panel sections having a top edge and first and second ends; an elongated horizontal track having first and second ends; a plurality of carrier means slideably supported by said track; and connecting means for suspending the track from a ceiling a sufficient height above any merchandise displays or aisles, wherein the top edge of said panels is adapted for attachment to said plurality of carrier means from a first end of said track by connecting a first end of said top edge of one of said panels to a first group of one or more of said plurality of carrier means, said first group of one or more plurality of carrier means slidable along said track to permit, from said first end of said track, said second end of the top edge of the panel to be connected to a second group of one or more of said plurality of carrier means, said second group of one or more plurality of carrier means slidable along said track to position the panel with respect to the merchandise displays or aisles by sliding it along said track.

2. A retail store information display device according to claim 1 wherein said connecting means comprises two or more vertical rods having first and second ends, said first end of said rods fastened to said track and the second end of said rods adapted to be fastened to a ceiling.

3. A retail store information display device according to claim 2 wherein wherein the second end of said vertical rods is fastened to a T-bar ceiling clip track.

4. A retail store information display device according to claim 2, wherein the first or second end of said rods is adapted to include means to permit the track to be raised or lowered.

5. A retail store information display device according to claim 1 wherein said track has a generally rectangular box-like cross section with an upper wall, generally parallel depending side walls and a bottom wall.

6. A retail store information device according to claim 5 wherein the bottom wall of the track is provided with a centrally located longitudinal channel and the bottom wall adjacent either side of said channel is bent inwardly to create a support means for said plurality of carrier means to slide along the track.

7. A retail store information display device according to claim 6 wherein said plurality of carrier means have a generally T-shaped body portion, a hook connected to a chain or other flexible fastening means depends from said body portion and a pair of wheels rotatably mounted to the carrier means wherein said wheels are spaced so that when inserted onto said track, the wheels roll along the inside surface of the bottom wall of said track.

8. A retail store information display device according to claim 1 wherein the track has a very small profile.

9. A method of displaying information comprising the steps of:

providing an information-bearing sign;

attaching a track having a first end and a second end to an overhead support;

slidably attaching carriers to said track;

attaching connectors to said carriers, each of said connectors including a sign-engaging portion;

while the track is attached to an overhead support, attaching said sign-engaging portions of said carriers to said information-bearing sign; and moving said information-bearing sign and said carriers along said track and into a desired position.

10. The method of claim 9 wherein said track has a length, and the step of attaching a track having a first end and a second end to an overhead support comprises the step of attaching a track having a first end and a second end to an overhead support perpendicularly to a series of shelves.

11. A method of displaying information comprising the steps of:

providing a first information-bearing sign;

providing a track having a first end including a retainer and a second end including a retainer;

attaching the track to an overhead support;

rollingly attaching carriers to the track;

attaching connectors to the carriers, each of the connectors including a sign-engaging portion;

attaching the sign-engaging portions of the carriers to the information-bearing sign; and moving the information-bearing sign and the carriers along the track and into a desired position.

12. The method of claim 11 including the additional step of removing the first information-bearing sign from the sign-engaging portion of the carriers while leaving the track attached to an overhead support.

13. The method of claim 12 including the additional steps of providing a second information-bearing sign and, after removing the first information-bearing sign from the sign-engaging portion of the carriers, attaching the second information-bearing sign to sign-engaging portion of the carriers.

* * * * *